Jan. 14, 1941.     G. BALAS     2,228,337
LOCKING MEANS FOR COLLETS
Filed June 2, 1939
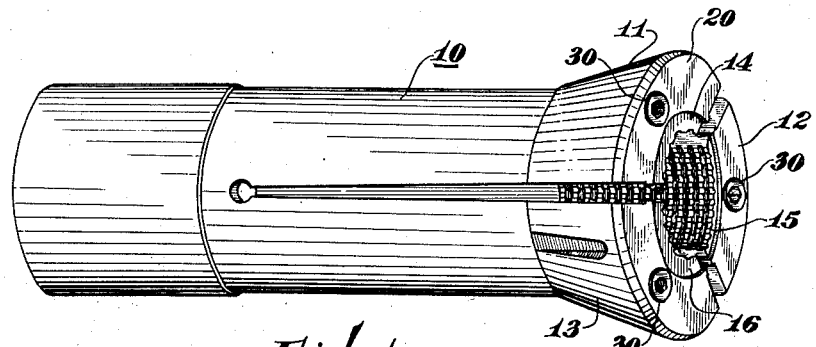
Fig.1.
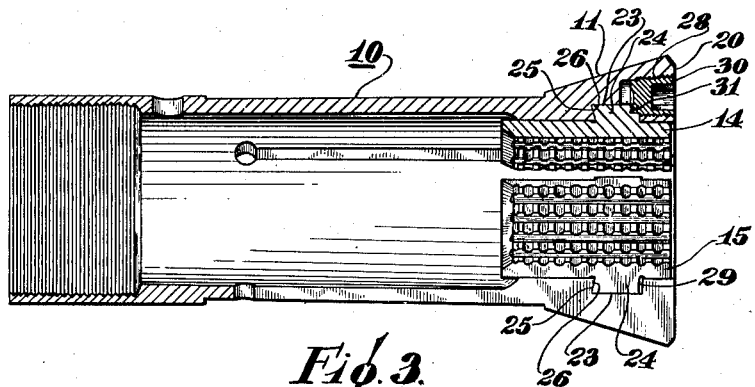
Fig.3.
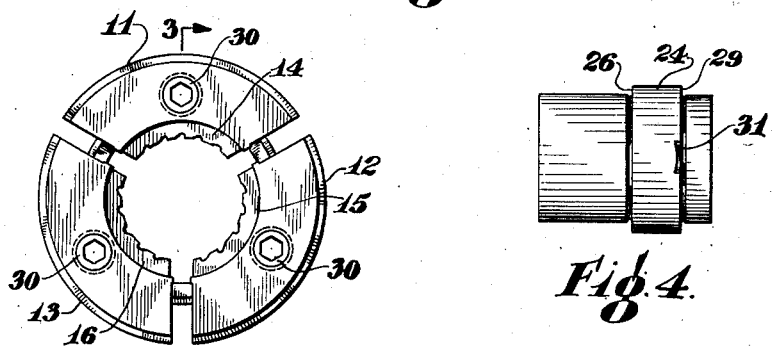
Fig.2.
Fig.4.
INVENTOR.
George Balas.
BY Hoodling and Krost
ATTORNEY.

Patented Jan. 14, 1941

2,228,337

UNITED STATES PATENT OFFICE 2,228,337

LOCKING MEANS FOR COLLETS

George Balas, Cleveland, Ohio, assignor to The Benco Manufacturing Company, a corporation of Ohio Application June 2, 1939, Serial No. 277,056

4 Claims. (Cl. 279—46)

My invention relates in general to collets and more particularly to locking means for positively securing the pads in the collet.

My invention finds particular utility in locking the pads in a master collet. With my invention, different sizes of pads may be quickly interchanged without removing the master collet from the spindle of the machine. When it becomes necessary to change the pads, this may be done with my invention in a few minutes, whereas formerly the time required to change the pads was a matter of hours. This time saving feature represents an enormous operating advantage because the machines remain non-productive for only a matter of a few minutes instead of hours.

An object of my invention is to provide a positive locking means for securing the pads within the collet.

Another object of my invention is the provision of a locking means for holding the pads in the collet which permits the ready interchangeability of the pads without removing the master collet from the spindle of the machine.

Another object of my invention is the provision of a locking means which circumferentially positions each pad upon each segmental arcuate portion of the collet.

Another object of my invention is the provision of a locking means which is unaffected by the strain of the work piece upon the collet.

Other objects and a fuller understanding of my invention may be had by referring to the following description and claims, taken in conjunction with the accompanying drawing, in which:

Figure 1 represents a perspective view of a master collet embodying the features of my invention;

Figure 2 is a front end view of the master collet shown in Figure 1;

Figure 3 is a longitudinal cross-sectional view, taken along the line 3—3 of Figure 2, and Figure 4 is a plan view of one of the interchangeable pads for the master collet.

With reference to the drawing, the master collet is represented by the reference character 10 and comprises generally three segmental arcuate portions 11, 12 and 13. The master collet is constructed of spring steel and tempered to give resiliency to the three segmental portions. The inside and outside engaging surfaces of the master collet are ground accurately to permit the interchangeability of the pads without the necessity of the readjustment of the collet within the machine. The pads are represented by the reference characters 14, 15 and 16. The outside arcuate view of a pad is illustrated in Figure 4. The forward end face 20 of the collet is flat and may be substantially perpendicular to the longitudinal axis of the collet.

As illustrated, each of the segmental arcuate positions 11, 12 and 13 is provided with an internal groove 23 and each of the pads 14, 15 and 16 is provided with a shoulder 24 which fits in the internal grooves 23. The complementary engagement of the shoulders 24 in the grooves 23 restrains the pads against limited longitudinal movement within the collet. The rearward edge surfaces 25 of the grooves and the rearward edge surfaces 26 of the shoulders make a dove-tail engagement with each other and are inclined at an angle with respect to a plane passing substantially perpendicular to the longitudinal axis of the collet to lock the pads radially into the collet. In order to accommodate for the easy interchangeability of the pads, the width of the grooves is slightly greater than the width of the shoulders to provide a clearance to compensate for the inclined surfaces of the rearward edge surfaces 25 and 26 of the grooves and the shoulders. The inclined rearward edge surfaces 25 and 26 of the grooves and the shoulders are locked complementary together by means of a plurality of set screws 30 which threadably engage threadable openings 28 which extend from the forward face 20 of the collet to the grooves 23 and which contact the forward edge face 29 of the shoulder on each of the pads. As illustrated in Figures 3 and 4, the inner ends of each of the set screws is arranged to fit into a small recess 31 which circumferentially positions each of the pads within each of the segmental portions of the collet.

The pads are made of a specially selected wear resistant steel and are heat treated to a high degree of hardness. In operation, the pads may be subjected to a large longitudinal stress incident to the pressure applied to the work piece. Thus, for example, when the work piece being held by the pads is being drilled longitudinally upon its end there is a heavy longitudinal strain exerted upon the pads to limit the inward longitudinal movement. This longitudinal inward strain is opposed by the interlocking engagement of the rearward edge surfaces of the shoulders and the grooves. An important feature of my invention is that the set screws themselves do not have to withstand any strain incident to the pressure upon the work piece.

The set of screws function to hold the pads radially within the segmental arcuate portions of the collet and are not subjected to the working strain.

Upon exchanging the pads, it is only necessary to unscrew slightly each of the set screws to permit the rearward edge surfaces of the shoulders to clear the rearward edge surfaces of the grooves. Upon the releasing of the pads by the set screws, the pads may be readily removed and a different set of pads inserted. The set screws 30, being positioned within the segmental portions of the collet, facilitate a wide latitude in the sizes of the pads. The wall of the pads may be thin as well as thick to accommodate different bore diameters, a condition which can not exist where the set screws or other lock means are positioned in the pads.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. A collet having a plurality of segmental arcuate portions, each said segmental portion having a forward end face and an internal arcuate groove positioned at a distance from the forward end face and extended radially from the bore of said collet, replaceable pad members for said segmental portions disposed within the bore of said collet, said pad members having radially extending ribs adapted to fit into said grooves upon moving the pad members radially outward in the collet, the rearward edges of the ribs and grooves being undercut to interlock in a radial direction upon rearward movement of the pad members in the collet, each of said segmental portions having a threaded opening extended from the forward end face of the collet to said grooves and disposed parallel to, and at a radial distance from, the bore of the collet, a threaded member adapted to extend through, and threadably engage, each said threaded opening, each said rib having a recess in alignment with said threaded opening, each threaded member having a cupped end, an edge portion of the cupped end being adapted to extend into a said recess and to engage a said rib, the engagement of the threaded member and said rib securing the respective pad members in locked position in said collet.

2. In a collet having replaceable pad members positioned therein, the collet and pad members having grooves and ribs, respectively, adapted to interlock upon the movement of the pad members rearwardly in the collet, the collet having threaded openings extending longitudinally thereof to said grooves and the ribs of the pad members having undercut recesses in alignment with said threaded openings, a plurality of threaded members adapted to extend through said threaded openings and to engage said ribs, said threaded members having cupped ends, a peripheral edge of the cupped end of each threaded member being adapted to extend into the undercut recess of each said rib, the engagement of the threaded member and rib securing the pad members in interlocked position to said collet.

3. A collet for hollow spindles comprising a tubular member longitudinally slotted to form a plurality of resilient segments, each segment having a conical external face for engagement with a conical recess in the spindle, replaceable jaw members for said resilient segments, a transverse undercut rib integral with said jaw member and a transverse undercut groove in said segment for receiving said rib, and a screw operable from the end of said collet for clamping said rib in engagement with said groove, said screw having a cupped end with the peripheral edge thereof adapted to engage said rib and said rib having a portion adapted to fit into the cupped end of said screw.

4. A collet for hollow spindles comprising a tubular member longitudinally slotted to form a plurality of resilient segments, each segment having a conical external face for engagement with a conical recess in the spindle, replaceable jaw members for said resilient segments, a transverse undercut rib integral with said jaw member and a transverse undercut groove in said segment for receiving said rib, and a screw operable from the end of said collet for clamping said rib in engagement with said groove, said screw having a cupped end with the peripheral edge thereof adapted to engage said rib, said rib having a complementary recess adapted to receive said peripheral edge of the screw.

GEORGE BALAS.